US010997832B1

(12) United States Patent
Vadayadiyil Raveendran et al.

(10) Patent No.: US 10,997,832 B1
(45) Date of Patent: May 4, 2021

(54) AUGMENTED REALITY BASED DYNAMIC GUIDANCE

(71) Applicant: INTERNATIONAL BUSINESS MACHINES CORPORATION, Armonk, NY (US)

(72) Inventors: Pramod Vadayadiyil Raveendran, Bengaluru (IN); Saiprasad Kolluri Venkata Sesha, Bengaluru (IN); Sougata Mukherjea, New Delhi (IN); Seema Nagar, Bangalore (IN); Kuntal Dey, New Delhi (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/703,229

(22) Filed: Dec. 4, 2019

(51) Int. Cl.
*G01C 21/20* (2006.01)
*G02B 27/01* (2006.01)
*G06Q 90/00* (2006.01)
*G06T 19/00* (2011.01)
*G08B 21/02* (2006.01)
(Continued)

(52) U.S. Cl.
CPC ........... *G08B 7/066* (2013.01); *G01C 21/206* (2013.01); *G02B 21/02* (2013.01); *G02B 27/01* (2013.01); *G02B 27/017* (2013.01); *G06F 3/011* (2013.01); *G06F 3/016* (2013.01); *G06F 3/0482* (2013.01); *G06K 9/00771* (2013.01);
(Continued)

(58) Field of Classification Search
CPC .......... G02B 2027/014; G02B 27/01; G02B 27/017; G06Q 90/205; H04W 4/30; H04W 40/90; G08B 21/02; G08B 7/066; G06K 9/00671; G06T 19/006; G06F 3/011; G06F 3/016; G06F 3/0482
See application file for complete search history.

(56) References Cited

U.S. PATENT DOCUMENTS

2012/0249588 A1  10/2012  Tison et al.
2014/0330511 A1  11/2014  Tison et al.
(Continued)

FOREIGN PATENT DOCUMENTS

CN     109377813 A    2/2019
EP       3324313 A1   5/2015
WO    2018048913 A1   3/2018

*Primary Examiner* — Jin Cheng Wang
(74) *Attorney, Agent, or Firm* — Tutunjian & Bitetto, P.C.; Michael A. Petroceili (57) ABSTRACT

The augmented reality system described herein calculates a personalized escape plan from a location for a user. A participant is registered to an emergency direction system that employs an augmented reality system to provide instructions to the participant to exit a data center. The emergency direction system receives a floor plan. The emergency direction system may also detect a hazard, and determine a hazard growth score. The emergency direction system can also compute a dynamic escape plan using hazard growth score and the hazard location. In some embodiments, the emergency direction system can also recalculate the dynamic escape plan to account for the person to carry an asset during exiting the structure corresponding to the floor plan in response to the hazard. Instructions for the person to exit the data center in response to the hazard carrying the asset are forwarded to the participant.

20 Claims, 7 Drawing Sheets

(51) Int. Cl.
  *G06F 3/01* (2006.01)
  *G08B 7/06* (2006.01)
  *G06K 9/00* (2006.01)
  *H04N 7/18* (2006.01)
  *G06K 9/62* (2006.01)
  *G06F 3/0482* (2013.01)
  *G02B 21/02* (2006.01)

(52) U.S. Cl.
  CPC .......... *G06K 9/6201* (2013.01); *G06T 19/006* (2013.01); *G08B 21/02* (2013.01); *H04N 7/181* (2013.01)

(56) References Cited

U.S. PATENT DOCUMENTS

| | | |
|---|---|---|
| 2015/0109334 A1 | 4/2015 | Park et al. |
| 2016/0140868 A1 | 5/2016 | Lovett et al. |
| 2017/0178013 A1 | 6/2017 | Beloglazov et al. |
| 2018/0129276 A1* | 5/2018 | Nguyen .................. G09B 9/00 |
| 2019/0012887 A1* | 1/2019 | Troesch .............. G08B 27/006 |
| 2020/0175639 A1* | 6/2020 | Sabripour .............. G16H 10/60 |
| 2020/0242360 A1* | 7/2020 | Alexander ............... G06K 9/66 |

\* cited by examiner

AUGMENTED REALITY BASED DYNAMIC GUIDANCE

BACKGROUND

The present disclosure generally relates to methods and systems for providing directions for exiting a location in real time, and more particularly to methods and systems for providing directions for exiting a building in an emergency, using an augmented reality system.

Augmented reality (AR) technology generally includes images along with annotations of features or objects displayed on the image. The AR images may be photographs or computer-generated images of an area of interest. The area of interest may be a city including buildings and roads, a park, a rural area, or the like. The annotations may identify the features or objects included in the AR image.

SUMMARY

In accordance with one aspect of the present disclosure, methods, and computer program products have been provided in which augmented reality (AR) is used to provide an escape route to personal within a data center (DC) in an emergency. In some embodiments, the methods, systems and computer program products of the present disclosure can provide escape routes that are sensitive to different zones of the data center (DC), and different motions that can be executed by a person, e.g., participant, that can be meaningfully executed within a location of the data center (DC) to allow the person to exit the location. For example, in some sections of the data center the user may run, and in some sections, the user may not physically have the space to run, and therefore can not run. Additionally, in some embodiments, the methods, systems and computer program products that are described herein can determine whether some objects can be carried away to safety in an emergency situation by a human. The methods, systems and computer program products that are described herein, may employ a profile specific to the user of the augmented reality (AR) system, in which the profile may include data on the height, weight and vulnerability of the user or an object carried by the user to a hazard type.

In one embodiment, the method may include calculating a personalized escape plan for a user. In one embodiment, the method may begin with registering a participant to an emergency direction system that employs an augmented reality (AR) system to provide instructions to the participant to exit a data center (DC). The system collects data from the participant, and the user can revoke permission at any time. In a following step, the emergency direction system receives a floor plan. The emergency direction system may also detect a hazard, and determine a hazard growth score. The emergency direction system can also compute a dynamic escape plan using hazard growth score and the hazard location. In some embodiments, the emergency direction system can also recalculate the dynamic escape plan to account for the person to carry an asset during exiting the structure corresponding to the floor plan in response to the hazard. Instructions for the person to exit the data center in response to the hazard carrying the asset are forwarded to the participant using the augmented reality (AR) system.

In another aspect, a system for providing a personalized escape plan is provided. In one embodiment, the system includes at least one database for floorplans of a structure, and at least one sensor interface for detecting a hazard on the floorplan. The system may further include a hazard growth calculator to determine hazard growth. The system may further include a hazard growth escape plan generator using hazard growth score and the hazard location on the floorplan. In some embodiments, the emergency direction system can also include an asset recovery escape plan calculator that recalculates the dynamic escape plan to account for the person to carry an asset during exiting the structure having the floor in response to the hazard. The system may also include an interface to an augmented reality system worn by the person. Instructions for the person to exit the data center (DC) in response to the hazard carrying the asset are forwarded to the participant using the augmented reality system.

In yet another aspect, a computer program product is provided that includes a computer readable storage medium having computer readable program code embodied therein for providing a personalized escape plan considering asset recovery. In one embodiment, the computer readable storage medium is non-transitory. The computer readable program code can provide the steps may include calculating a personalized escape plan for a user. In one embodiment, the method provided by the code may begin with registering a participant to an emergency direction system that employs an augmented reality system to provide instructions to the participant to exit a data center. The system collects data from the participant, and the user can revoke permission at any time. In a following step, the emergency direction system receives a floor plan. The method may also include detecting a hazard, and determining a hazard growth score. A dynamic escape plan may then be computed using hazard growth score and the hazard location. In some embodiments, method further includes recalculating the dynamic escape plan to account for the person to carry an asset during exiting the structure corresponding to the floor plan in response to the hazard. Instructions for the person to exit the data center in response to the hazard carrying the asset are forwarded to the participant using the augmented reality system.

BRIEF DESCRIPTION OF THE DRAWINGS

The following description will provide details of preferred embodiments with reference to the following figures wherein.

DETAILED DESCRIPTION

The methods, systems, and computer program products described herein provide a live guided personalized escape plane from a data center (DC), in the event of detection of hazards, such as fire and/or smoke, overheating or electrical hazards, such as short circuits. In some embodiments, an augmented reality device provides guidance to the individual participant based upon the detected hazard shape/zone and data center map, along with dynamically generated specific motion guidance at micro-segments, and picking up feasible and valuable object on the way to escape to physically save important aspects referring to FIG. 1-4. Some features of the methods, systems and computer program products may include dynamically computing a personalized escape map. The personalized escape map may be based upon at least one of the following: 1) the current location of the participant 10; 2) the known floor map for the location, e.g., data center (DC); 3) the detected danger zones; 4) the exit paths from the current location of each participant to each exit; 5) the interception of the hazards that already block some of the paths; 6) the vulnerable assets 35 along the way, e.g., the narrow passage where the person 10 may brush against a server rack, etc.; and 7) combinations thereof. The participant map is displayed to the user, i.e., participant 10, on an augmented reality, e.g., virtual reality, system being viewed by the user, i.e., participant 10. In some embodiments, for each path that one person may go by to escape the hazard, a computer vision apparatus use the images obtained from the camera to find the objects laying along that path/route, which can be picked up by the escaping person 10 on the path/route given its size, expected weight, its value, its estimated vulnerability to the hazard type. It is noted that not every object is recommended for being picked up by the participant 10. The participant 10 can only pick up only a finite number of objects along the way. The objects to be picked up by the participant 10 on the path/route by which the participant 10 is exiting the location can then be embedded into the escape map. More specifically, the objects 35 to be picked up by the participant 10 on the path/route is embedded into the escape plan being displayed to the user, e.g., participant 10, on the augmented reality display 15. The escape map is recomputed to ensure that the time to pick up objects 35, and the reduced speed of movement during the pick up still keeps the escape path safe for the participant 10 to escape the hazard. If the objects to be picked up on the path render the path unsafe, the steps of calculating an escape path, and locating objects 35 along the proposed escape bath are recomputed until a safe combination is configured.

In some embodiments, an audible instruction, such as voice issued instruction, and/or a combination of visual/textual instruction and/or a combination of audible and visual/textual instruction can be rendered on the augmented reality (AR) device 15, in which those instructions provide guidance to the participant on how to escape a hazard 30, e.g., escape a building/room, e.g., data center, to the participant on a step by step basis. The step by step instructions may dependent upon the current location of the participant, the current location of the hazard 30, the current motion of the participant 10, the current motion of the hazard 30, the escape plan that has been generated and the destined exit. The instructions can be as follows, "slow down 2 steps ahead", "turn left", and "pick up the hard disks lying ahead on your right side", etc. The methods and systems of the present disclosure are now described in greater detail with reference to FIGS. 1-7.

Figure 1:
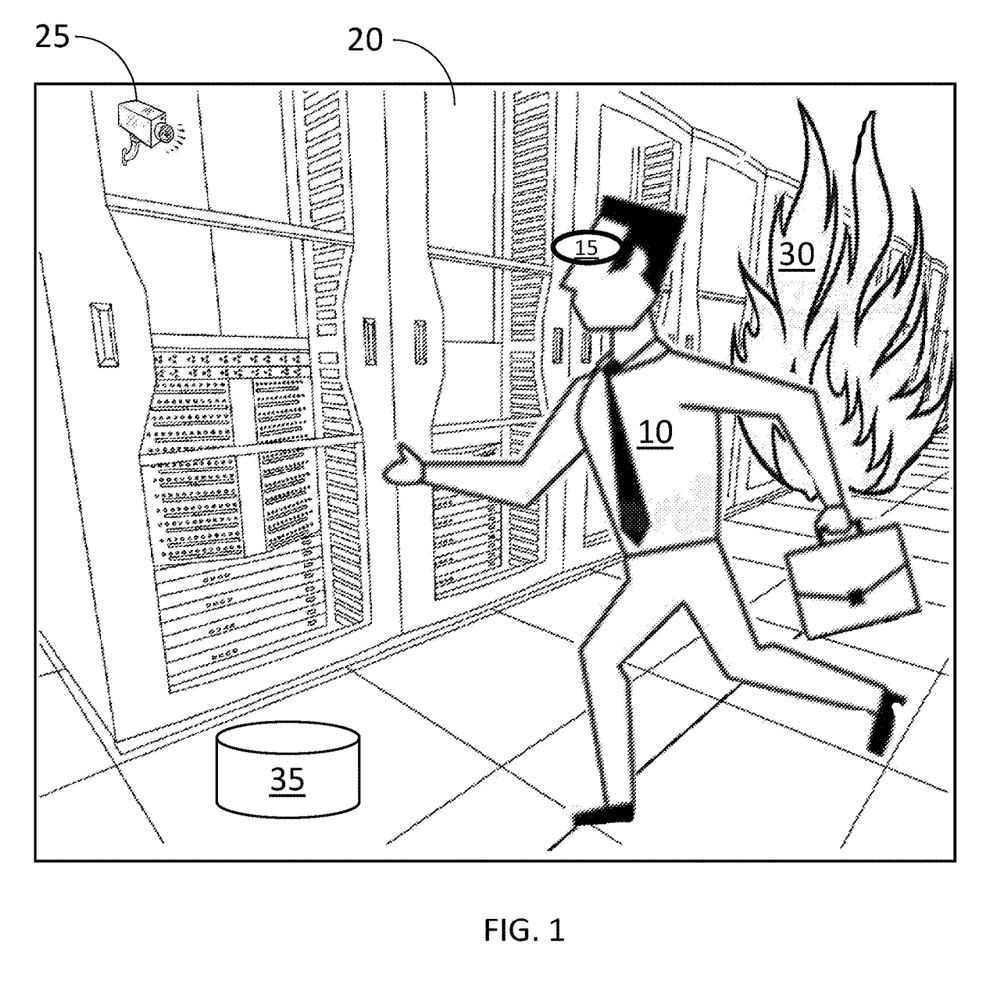
FIG. 1 is an environment illustrating one embodiment in which the methods, systems and computer program products of the present disclosure can employ an augmented reality (AR) system to provide directions for a person to navigate a data center (DC) when there is an emergency.

FIG. 1 is an environment suitable for at least one embodiment in which the methods, systems and computer program products of the present disclosure can employ an augmented reality (AR) system 15 to provide directions for a person 10 to navigate a data center (DC) 20 when there is an emergency, such as a fire. The data center (DC) 20 is a highly dynamic environment which requires multiple disciplines and technology owners to manage. Typically, different departments within a company are responsible for managing different functions, deployments, and operations; such as: space allocation, storage, network asset availability, server provisioning, and facilities management. The data center (DC) 20 may be a building, or a dedicated space within a building, or a group of buildings used to house computer systems and their associated components, such as, for example, telecommunications systems, storage systems, and the like. Because information technology (IT) operations are crucial for business continuity, IT generally includes redundant or backup components and infrastructure for power supply, data communications connections, environmental controls (e.g., air conditioning, fire suppression, and the like) and various security devices. A large data center 20 may be an industrial scale operation using as much electricity as a small town.

A data center 20 can have a complex floor plan 21 with multiple turns and corridors, as well as obstacles in the form of data racks, electrical equipment, etc. In an emergency, a person, e.g., participant 10, that is present in a data center 20 may have difficulty finding their way to an exit. The hazards that can be the cause of evacuating a data center 20 can include electrical issues, such as short circuits, which could cause an electrical fire. In other examples, the hazards that can be the cause of evacuating a data center 20 can include weather related hazards, such as forceful gusting winds, flooding waters etc. In other examples, the hazards may be fire related, such as flames and/or smoke. In the example that is depicted in FIG. 1, the hazard is a fire, wherein the hazard is identified by reference number 30. It is noted that the methods, systems and computer program products that are described herein, are not limited to only the example in which the hazard is a fire.

As will be described herein, the methods, systems and computer program products can employ an augmented reality based systems 15 to provide directions to an participant to escape a hazard 30 in a data center 20. As used herein, the term "augmented reality (AR)" is an interactive experience of a real-world environment where the objects that reside in the real-world are "augmented" by computer-generated perceptual information, sometimes across multiple sensory modalities, including visual, auditory, haptic, somatosensory, and olfactory. The overlaid sensory information can be constructive (i.e. additive to the natural environment) or destructive (i.e. masking of the natural environment) and is seamlessly interwoven with the physical world such that it is perceived as an immersive aspect of the real environment. In this way, augmented reality alters one's ongoing perception of a real-world environment, whereas virtual reality completely replaces the user's real-world environment with a simulated one. In some example, augmented reality brings components of the digital world into a person's perception of the real world, and does so not as a simple display of data, but through the integration of immersive sensations that are perceived as natural parts of an environment.

Figure 2:
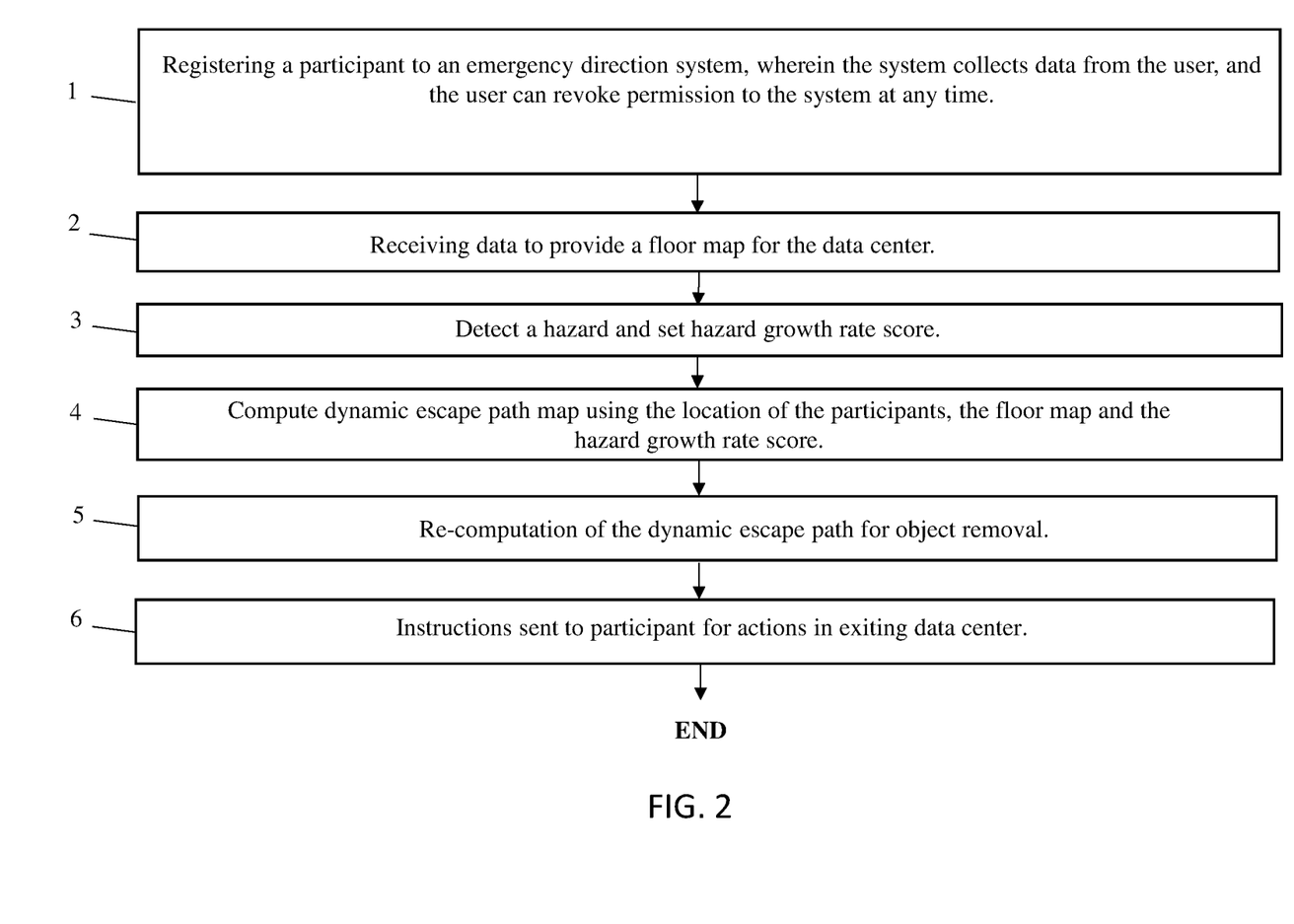
FIG. 2 is a flow diagram showing a method for using an augmented reality (AR) system to provide directions for a person to navigate a data center (DC) when there is an emergency, in accordance with the present disclosure.
Figure 3:
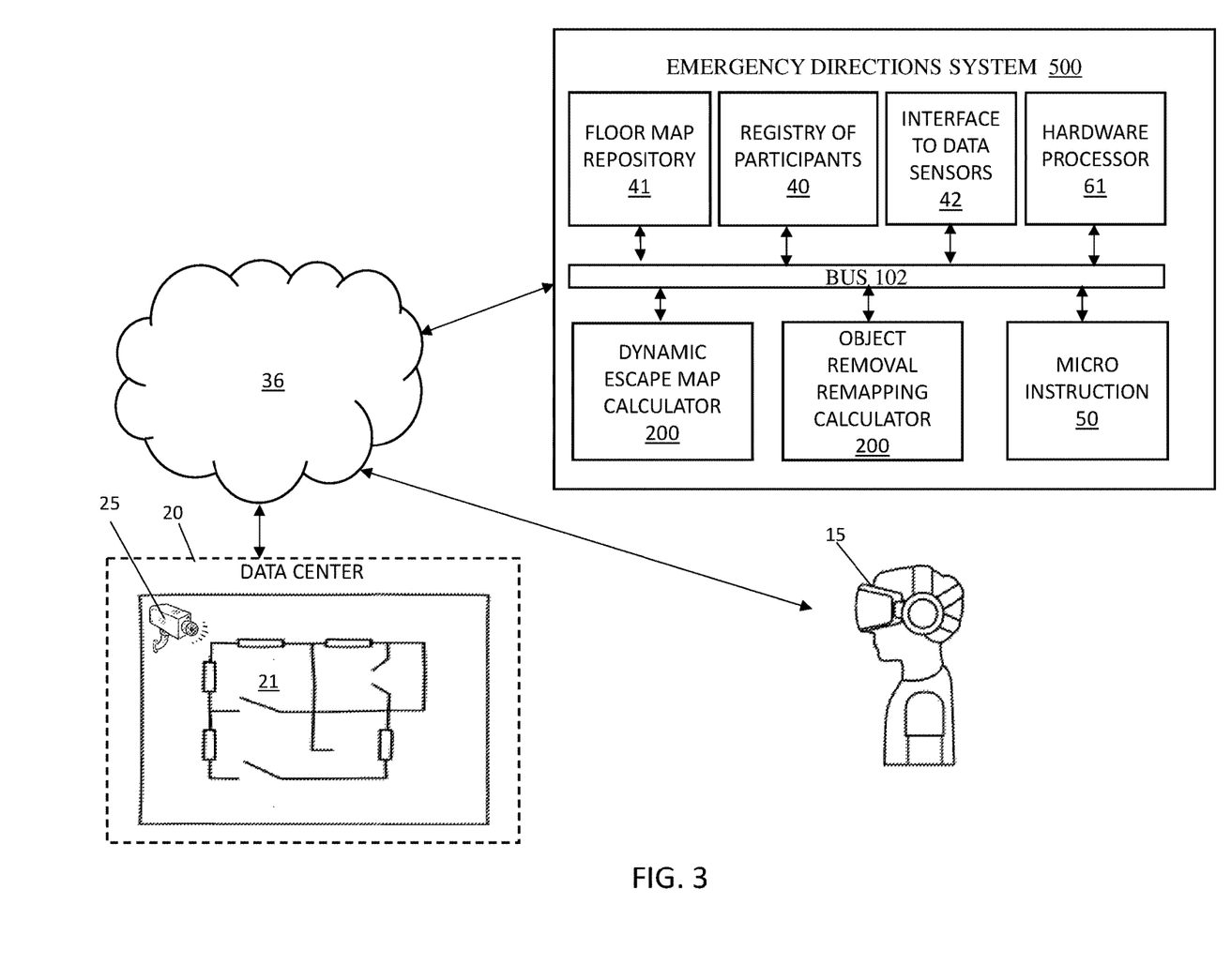
FIG. 3 is a flow/block diagram depicting a first embodiment of a system for providing an augmented reality (AR) system for providing directions to a person to navigate a data center (DC) when there is an emergency, in accordance with the present disclosure.
Figure 4:
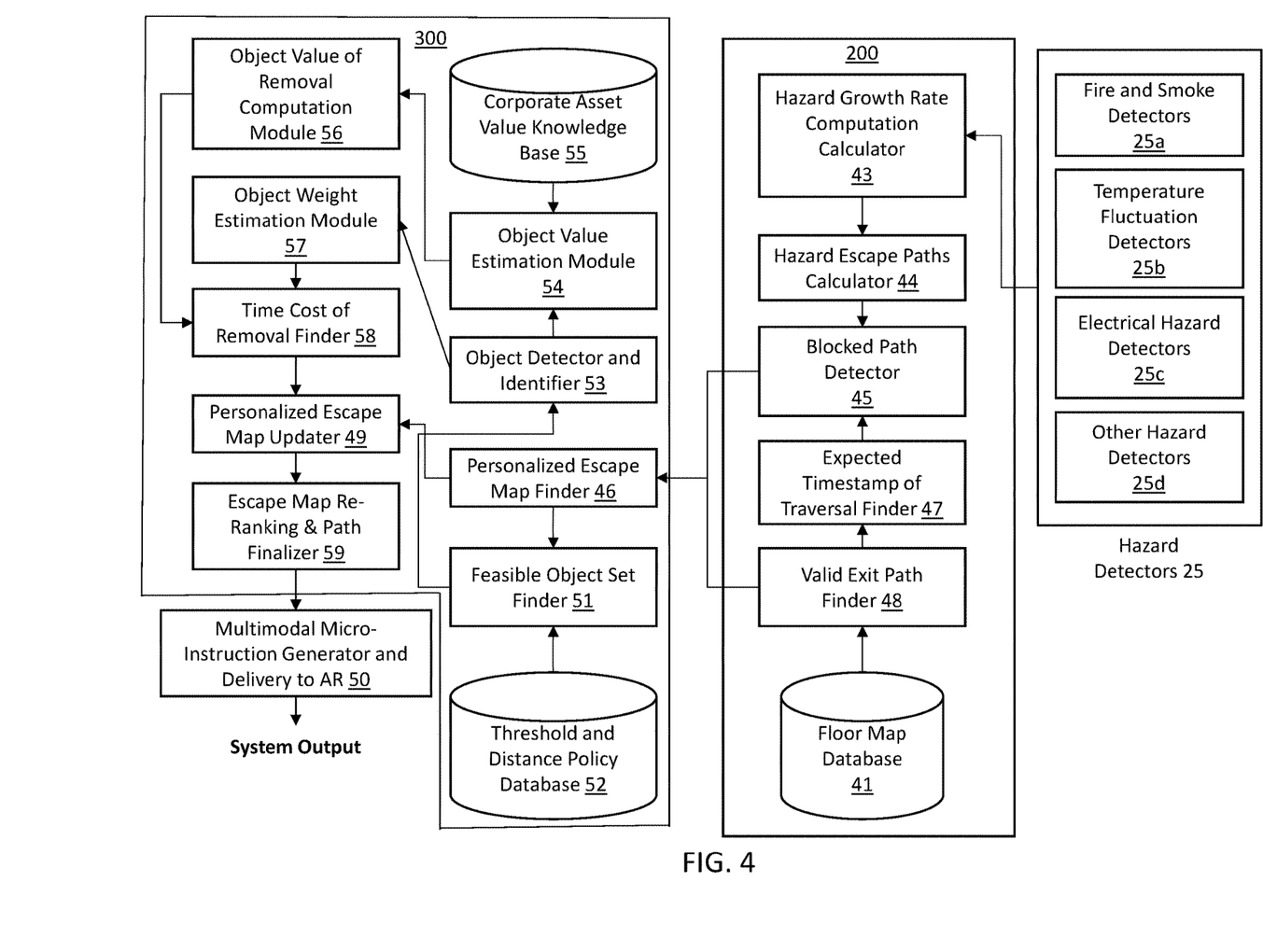
FIG. 4 is a flow/block diagram depicting another embodiment of a system for providing an augmented reality (AR) system for providing directions to a person to navigate a data center (DC) when there is an emergency, in accordance with the present disclosure.

FIG. 2 is a flow diagram showing a method for using an augmented reality (AR) system, e.g., augmented reality glasses 15, to provide directions for a person, e.g., participant 10, to navigate a data center (DC) 20 when there is an emergency, e.g., the presence of a hazard 30. FIGS. 3 and 4 are a flow/block diagram depicting one embodiment of a system for providing an augmented reality (AR) system for providing directions to a person to navigate a data center (DC) when there is an emergency, in accordance with the present disclosure.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The method may begin with the computation of a hazard growth rate analysis. This can be performed by a dynamic escape plan calculator 200 of the escape direction system 500, as depicted in FIGS. 3 and 4. In some embodiments, the hazard growth rate analysis includes determining a floor plan 21 of the data center 20, determining the presence of obstacles 35 on exit pathway, determining the location of assets 35 within the data center 20, and determining the presence of a hazard 30.

Referring to block 1 of FIG. 2, in one embodiment, the method for using an augmented reality (AR) system, e.g., augmented reality glasses 15, to provide directions for a person, e.g., participant 10, to navigate a data center (DC) 20 when there is an emergency, e.g., the presence of a hazard 30 can begin with registering a participant 10, to an emergency escape system 500. The system collects data from the person, e.g., participant 10, and the participant 10 can revoke permission to the system at any time.

The computation of the growth rate analysis may begin with receiving data to provide a floor map 21 for the data center 20 at block 2 of the method depicted in FIG. 2. For example, a floor map 21 of the data center 20 may be received by an emergency direction system 500 including a floor map repository 40. The floor map for the data center 20 may be uploaded to the emergency escape system 500 by a system administrator. In this example, the floor map 21 may be provided by any architectural/engineering plans. In other examples, the floor map 21 for the data center 20 may be measured from any number of cameras 15 or other sensors 25 that are on the location to which the emergency direction system 500 is administering service.

At blocks 3 and 4 of the process flow depicted in FIG. 2, the method may continue with detecting a hazard 30 within the data center 20. Detecting a hazard 30 may begin at block 3 with registering a plurality of sensors 25 that can take at least one measurement of at least one portion of the data center 20, in which the plurality of plurality of sensors 25 are suitable for recognizing and/or tracking at least one of the participants 10, assets 35, and hazards 30. The sensors 25 are generally distributed throughout the data center 20. For example, the data center 20 may be arranged in a plurality of segments, in which at least one sensor 25 is in each of the segments. In some embodiments, the sensors 25 take video images for recognizing/tracking the participants 10, assets 35 and hazards 30. The sensors 25 may be in communication with the emergency direction system 500 over a network 36. As will be further described below, the augmented reality system 15 is also in communication with the emergency direction system 500 over the network 36.

In one embodiment, the sensors 25 and/or the augmented reality system 15 may include a WiFi radio to establish a WiFi connection through a WiFi access point or router which couples these devices to the Internet (e.g., via an Internet Service Provider providing Internet service to the end user), which in turn connect to the emergency direction system 500. Of course, it should be noted that the underlying principles of the invention are not limited to any particular type of communication channel or protocol.

One or more portions of the network 36 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks. Any one or more portions of the network 36 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

It is noted that the video cameras depicted in FIGS. 1 and 2 are not the only type of sensors 25 that are suitable for identifying and/or tracking the participants 10, the assets 35 and/or the hazards 30. For example, the sensors 25 may be internet of things (IOTs) type devices. The Internet of things (IoT) is the network of physical devices, vehicles, home appliances, and other items embedded with electronics, software, sensors, actuators, and connectivity which enables these things to connect, collect and exchange data. The IoT devices can be equipped with various types of sensors to collect information about themselves and their surroundings, e.g., the IoT devices can function as sensors 25 measuring the hazards 30, the assets 35 and the participants 10, and provide the collected information to the emergency direction system 500 over a network 36, such as an internet connected network. As noted above, the IOT devices can be cameras. In other embodiments, the IOT devices can be sensors 25, such as temperature sensors, humidity sensors, sunlight sensors, or any other type of sensor that can measure variables, such as atmosphere conditions, which can be used to measure a hazard 30, as well as the rate and/or direction in which a hazard 30 is spreading.

In some embodiments, sensors 25, e.g., internet of things (IOT) devices, can be intelligent systems that can gather images via video or camera devices for cognitive visual recognition. Examples of internet of things (IOT) devices that have image taking abilities, e.g., video and/or camera picture taking, can include security cameras; baby monitors; computers with web cams; televisions with web cams, front and/or back facing cameras of mobile devices, such as smart phones and/or tablet computers; and combinations thereof. Other examples of internet of things (IOT) that can include a video camera for include a lightbulb, a luminaire, a lighting system, a door lock, a water heater, a sprinkler system, an air-conditioner, a thermostat, an alarm clock, a window shade, a switch, a smoke alarm, an electrical outlet, an alarm, a personal proximity sensor, a door sensor, a biometric sensor, a cooking device, an electrical breaker, a personal alert sensor, a motion sensor, a calendar, a radio, a radio frequency identification (RFID) tag/RFID detector, a distributed energy storage (e.g. battery), a thermometer, and combinations thereof.

In the embodiments depicted in FIGS. 2 and 3, the sensors 25 may be devices for capturing images of hazards 30, participants 10 and/or assets 35, are camera's, such as security cameras or web based video cameras. Referring to FIG. 3, in one embodiments, the sensors 25 can include fire and smoke detectors 25a, temperature fluctuation detectors 25b, electrical hazard detectors 25c as well as other similar hazard detectors 25d.

The aforementioned sensors 25 may be in communication with the emergency direction system 500 through an interface to data sensors 42, as depicted in FIG. 3.

Referring to FIG. 2, the method may continue with a hazard growth rate analysis at block 4 at which measurements are made from the sensors 25 that were registered at block 3. The hazard growth rate analysis may be calculated by a hazard growth rate calculator 45. The hazard growth calculator 45 may include at least one hardware processor 61 that using the date provided from the sensors 25 can calculate a hazard growth rate score. As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

These and other variations of a hardware processor subsystem are also contemplated in accordance with embodiments of the present invention.

The hazards 30 may be fire, smoke, sudden temperature fluctuations in certain zones, electrical issues such as short circuits, flood water or gusts of wind entering through one side of the data center 20. The sensors 25 can make time series recordings of the hazards 30 within the data center 20 to provide data inputs to the emergency direction system 500, e.g., for small periods of time, such as for time periods of 5 seconds or 10 seconds, etc. Measurements of the hazards 30, such as their locations and/or speed of the hazard 30 being spread, at appropriate locations within the data center 20 can be used to provide the hazard growth rate. In some examples, the hazard growth rate can be computed from the data on the hazard 30. At each instant of time, a list of new sensors 25 that have also detected the hazard 30 (that had not detected the hazard in the earlier instant of time) are identified. The proximity of the new sensors 25 with the other adjacent sensors 25 that had detected the hazard 30 earlier, is computed. In some embodiments, the proximity of new sensors 25 with the other adjacent new sensor that had not previously measured the hazard 30 earlier, is also computed.

From the measurements of the changing position of the hazard 30 by the sensors 25, a hazard growth rate score is calculated. The hazard growth rate score is assigned, at proportion to the number of new sensors 25 at a step of time, and these successive adjacent sensors are clustered together. For example, a sensor 25 is positioned in each sensitive portion of the floor plan 31. The sensors 25 may be arranged in a grid. The sensors 25 that are triggered when hazard 30 is present in the corresponding portion the floorplan are compared to the sensors that are not triggered because the hazard is not present in the corresponding portion of the floorplan to determine the location and spread of the hazard 30. In the scenario when to sensors 25 overlap, their function is merged, and the hazard growth rate is assigned to each cluster, e.g., merged sensors 25, and each sensor 25 within the cluster has the same score with respect to hazard type 30. The sections of the data center 20 in which hazards 30 are located may be referred to as hazard points.

Referring to FIG. 2, in some embodiments, following the calculation of the hazard growth rate using the hazard growth rate calculator 43, a dynamic escape path map computation may be generated at block 4. The dynamic escape map computation may be performed by a personalized escape map generator 46 of the system depicted in FIGS. 3 and 4. The personalized escape map generator 46 receives an input from a valid exit path finder 48, in which the valid exit path finder 48 includes a data input from a floor map database 41. The personalized escape map generator 46 also receives an input from a blocked path detector 45. The inputs to the blocked path detector 45 include the hazard path calculator 44 (which determines the spread of the hazard 30 taking into account the hazard growth rate from the hazard growth rate calculator 43); and the expected timestamp of traversal finder 47. An input to the expected timestamp of traversal finder 47 is the valid exit path finder 48.

In some embodiments, based upon the current location of the participant 10, the known floor map, the detected danger zones on the floor map (know from the hazard growth rate) the exit paths (also referred to as escape paths) from the current location of the participant 10 to each exit, e.g., target (escape point), of the data center 20 can be calculated. The calculation can be made using an algorithm such as Dijkstra shortest path algorithm, e.g., Dijkstra first shortest path algorithm. Dijkstra's algorithm is an algorithm for finding the shortest paths between nodes in a graph, which may represent, for example, the network of paths in a data center 20. More specifically, in some embodiments, Dijkstra's shortest path algorithm is employed, in which each key point may be a turn that is designated a vertice, each connecting path/corridor between such pairs of points is designated as edges, and edges that intersect with hazard points are ignored.

Still referring to block 4 of FIG. 2, in a following step, using the hazard growth rate score computer earlier, a hazard spread timestamped map is then computed, wherein the computation is provided by a hazard path calculator 44 (which can employ the hardware processor 61) of the system depicted in FIGS. 3 and 4. The hazard spread timestamped map is calculated for each granularity of time, e.g., each 10 seconds, in which each of the potential hazard-affected zones within the data center are computed. This includes taking new measurements using the sensors 25 of the spread of the hazard 30, or the detection of new hazards 30 in the data center using the sensors 25.

In some embodiments, for each edge lying on each computed valid exit path, an expected timestamp of traversal of a given person is computed, based on the current location of the person, the nature of the path, the sensitive zones on the path, and the location of the edge. The expected timestamp of traversal may be calculated using the expected timestamp of traversal finder 47 of the system depicted in FIGS. 3 and 4. The expected timestamp of traversal finder 47 considers the nature of the path being traversed by the participant 10, and can include a measurement of an expected speed of movement by the participant 10 through this portion of the computed valid exit path, which is provided by the valid exit finder 48 taking into account the floorplan of the datacenter 20 provided by the floor map database 41. In some embodiments, the expected speed of movement of the participant 10 can be determined from motion sensors, such as an accelerometer, in the augmented reality system 15 being employed by the participant 10. The expected timestamp traversal finder 47 may also employ a profile of the participant 10, such as when the augmented reality system 15 identifies the participant 10. For example, the expected timestamp traversal finder 47 can employ a profile of the participant 10 including previous measurements of the speed at which the participant can travel, and can use that information to determine how long a participant is expected to traverse a portion of a route. The profile may include historical data on the participant that is stored in the registry of participants 40. The historical data can include measurements taken from the participants 40

The sensitive zones on the path that the expected timestamp traversal finder 47 considers in determining the expected timestamp of traversal may include vulnerable assets along the way, e.g., narrow passages where the person (also referred to as a participant 10) might impact is high, such as when a participant 10 contacts a server rack.

The computation of the dynamic escape path map can continue, and for each expected timestamp of traversal, for each edge, and overlapping may be carried out with the hazard spread timestamped map computed earlier. In the instances, in which an overlap is detected, the path is also deemed unsafe, as it indicates that the path will be affected with (intercepted by) the hazard by the time the person arrives on the path, even if the path is currently not affected, so practically this is a blocked path.

A time-level prediction of how the disaster 30 will spread over time, and the sensors 25 stop reading the presence of the disaster 30, will also be calculated as part of this method. Over time, the method is equipped to handle with lesser and lesser support from the infrastructure, and that expectation is dynamically determined. All the blocked paths are removed from the list of the valid exist paths and these valid exist paths are augmented with expected time to escape, which is computed as a difference of the expected time of traversal on the final edge (or final node) of the path lying at the exit point and a current location of the person. Therefore, a personalized escape map is dynamically computed which includes tuples of a set of valid exit paths for the data center 20, and expected time to escape for the participant 10.

The dynamic escape path calculations described herein provides at least some of the following described advantages. The methods, systems and computer program products described here can propose for the participant to pick up feasible objects, such as assets, while the participant 10 is exiting the data center 20 to avoid the hazard 30. The methods, systems and compute program products can determine a trade off that is acceptable between the value of the object, e.g., asset, to the organization owning the data center 20 in comparison to the timely exit of the participant 10, in which the timely exit is before the hazard 30 spreads to block the path of the participant 10. The methods, systems and computer program products that are described herein consider picking up objects, such as assets, while the participant 10 is exiting the data center 20 to avoid a hazard 30; estimates times for how paths are blocked due to hazard; and calculates the slow down attributed to the object being obtained by a participant 10 who is exiting the data center 20. The slow down attributed to the object can include the participant 10 moving slower when holding the object and/or the time added to the persons exit time by stopping to pick the item up.

Referring to FIG. 2, the method may continue to block 5 with an escape path re-computation for object 35 removal. This recalculation may be in some embodiments, for each valid exit path on the personalized escape, a computer vision module detects all the objects 35 within a given threshold size limit that lie within a threshold distance of at least one edge of the path, which designates a feasible object set. The feasible object set finder is identified by reference number 51 on FIG. 4. The given threshold size limit is the size of an object 35 that can be carried by a person 10 when exiting the data center 20 in response to avoiding a hazard 30. The threshold distance is the distance from the exit path that an object 35 can be present without negatively impacting the person's 10 exit time from the data center along a path. The threshold distances and threshold sizes are stored in a threshold and distance policy database 52, which is an input into the feasibility object set finder 51. The personalized escape map finder 46 is also in input to the feasibility object set finder 51. The feasible object set finder 51 is an input into the object detector and identifier 53. The object detector and identifier 53 may employ a computer vision module. The computer vision module may employ artificial intelligence utilizing computer software programs that analyze the images from the sensors 25 in order to recognize objects. The A.I. program functions by using machine vision. Machine vision is a series of algorithms, or mathematical procedures, which work like a flow-chart or series of questions to compare the object 35 seen with stored reference images of objects 35 in different angles, positions and movements. Many other questions are possible, such as the degree to which the object is reflective, the degree to which it is steady or vibrating, and the smoothness with which it moves. Combining all of the values from the various questions, an overall ranking is derived which gives the A.I. the probability that an object 35 on or close to being on an exit path of a data center 20 matches an object 35 stored in the corporate asset value knowledge base 55. This type of A.I. is known as "rule-based". In some embodiments, the computer vision module includes at least one hardware processor for executing a series of instructions for analyzing the images taken by the sensors 25, and comparing the images to comparison objects from the data saved in the corporate asset value knowledge base 55.

The objects 35 may be any object that would have some value to the owner of the data center 20. For example, the object 35 may be some form of electrical device having data, e.g., financial data, scientific data, engineering data, business data, client data, software etc. In other examples, the object 35 may be a physical structure or compositional structure or prototype structure. The object 35 can be anything of value to the owner of the data center 20.

In some embodiments, for each object in the feasibility object set 51, a value estimation is carried out for the object 35. The value estimation may be calculated using the object value estimation module 54. As noted, in some embodiments, one input to the object value estimation module 54 may be the object detector and identifier 53, and the corporate asset value knowledge base 55. The corporate asset value knowledge base 55 may include stored data providing a ranking of value for objects 35 that may be present in the data center 20. In one example, the ranking may be monetary. In another example, the ranking may be based upon the presence of intellectual property.

In one example, the value estimation calculated by the object value estimation module 54 may include that the object 35 is first identified, if feasible, e.g., by the object detector and identifier 53. In some examples, this might be by using computer vision modules, or registered objects 35, such as corporate laptops, or bar-coded objects where the bar code can be read by a sensor 25, e.g., camera (such as, a bar code on a system box or a hard disk with mapping of the serial number to the corporate knowledge base), or other sensor-enabled devices that can emit signals, such as blue tooth, RFID, networking signals, and combinations thereof. The value of each object 35 can then be computed. If a detected object 35 is identifiable, and if it is a technical object/asset, such as, a hard disk where the disk could be identified, or a laptop which could be identified, etc., then a value estimation is carried out for the specific object 35, using the corporate knowledge base of the value of the asset 35 provided from the corporate asset value knowledge database 55, such as the value of data and code contained in the device, the worth of clients whose data were stored, etc., and a total value is assigned to each such identified object 35. If a detected object 35 is identifiable, but is not a technical object/asset, then a catalog value of the object/item is assigned. For example, in an embodiment, it could also do a dynamic web look up. If a detected object 35 is not identifiable, then, a constant (baseline) notional value is given. In some embodiments, for each object 35, if identifiable, then a known weight value is assigned, and otherwise, a notional baseline weight value is assigned.

In some embodiments, a value of removal is computed by an object value of removal computational module 56, as a function (such as product) of the value of the object 35, the size and weight of the object 35. The value of removal is computed by the time cost of removal finder 58. The input to the time cost removal finder 58 includes an object value of removal computation module 56 and an object weight estimation module 57. The object weight estimation module 57 is fed data on the objects 35 from the object detector and identifier 53.

For each object 35 in the feasible object set provided by the feasible object set finder 51, a time cost of removal is computed as a function of (a) the additional expected time to pick the object up which is a function of the distance of the closest point from any edge along the closest valid exit path to the object and (b) the estimated reduction of speed of running/escaping caused by the estimated weight of the object 35, which can be provided by the object weight estimation module 57.

The time to escape as found for each element in the personalized escape map is updated to update the expected timestamp of traversal of the edges beyond the object, by adding time cost of removal produced by the time cost of removal finder 58 to have updated values of expected timestamp of traversal. A time-level prediction of how the disaster will spread over time and the sensors will disappear will also be considered.

The updated values of expected timestamp of traversal are again overlapped with the hazard spread timestamped map from the hazard path calculator 44 and the additional blocked paths are eliminated from the valid exist path set, thereby leading to an update of the personalized escape map that is provided by the personalized escape map updater 49.

Thus, using the above steps, the personalized escape map is updated from <valid exit path, expected time to escape tuples to <object identifier, feasible valid exit path, expected time to escape> triplets by the escape map re-ranking and path finder module 59. A ranking process is carried out, wherein, the input is the set of elements belonging to the personalized escape map, the ranking arranges the objects 35 on the map in the order of the highest to lowest value of removal scores. Also, how the time taken to pick up changes the object 35 the potential escape path will also be calculated and updated accordingly.

The first element in this list is finalized, and recommended to the user, as the best escape route, and is taken to the next step for processing and delivering in form of micro-instructions to the user by the multi-modal micro-instruction generator and delivery augmented reality module 50.

Referring to FIG. 2, the method may continue to instructions sent to participant for actions in exiting the data center 20 at block 6 of FIG. 2. This re-computation may be provided by the object removal remap calculator 300, in which each of the components of the object removal remapping calculator may employ the hardware processor 61 for computation. In this step, the best path (computed earlier) is rendered in the augmented reality (AR) device, using color maps and directions. In an embodiment, multiple views can be presented to the person 10 wearing the augmented reality (AR) device, such as a map view, a speech-based instruction (using natural language generation and speech synthesis) that can be delivered in the augment reality (AR) space, a dynamically generated overlay of paths and arrows, etc. When a person 10 that is wearing the augmented reality (AR) device approaches an object 35 having a value that warrants it being removed from the data center 20, as the person 10 exiting the data center 20 nears the object 35 to pick up (if the final feasible object set is not null), the augmented reality (AR) will also show to the person 10 where to pick up the object 35. The AR device will guide the user 10 to the exit for the data center 20.

In one use example, a person 10, e.g., data center engineer, having access to the augmented reality system 15 is working on a server in a rack within a data center 20. The data center 20 starts to fill with smoke, which is a hazard 30. The data center 20 issues alarms about the fire and smoke within the data center 20, as well as make announcements about fire and smoke within the data center 20. The person 10 wearing the augmented reality system 15 may then get instructions to move out of data center 20. The person 10 may then activate the augmented reality (AR) based hazard escape module, e.g., escape path system 500, at which time the person 10 can start getting micro instructions through the augmented reality (AR) glasses in the form of audio and texts to exit the data center 20. As the person 10 begins to move towards and exit path, as per the instructions the person 10 wearing the augmented reality (AR) gasses is given through the augmented reality (AR) glasses. As the person 10 is moving through the data center 20, the person 10 received updated exit instructions from the system 500 through the augmented reality glasses 15. In this example, as the person 10 is moving through the data center 20 to the exit, the instructions that he received provides that the person 10 avoids the hazard 30 by instructing the person 10 to avoid unsafe paths. At some places, the system 500 warned the person 10 about narrow passages and the objects blocking the path so that he could adjust his steps accordingly. In one instance, the system 500 designated an asset 35 of value, such as a hard disk lying on a rack, and suggested to the person 10 wearing the augmented reality (AR) glasses to pick up the asset 35 while exiting the data center 20. The system 500 shows the path on the augmented reality (AR) device to the person 10, and delivered a speech and visual interface to take the person through the appropriate path, and to take the correct turns to pick up the object 35. Finally, the person 10 exited the data center 20 through an exit door.

FIGS. 3 and 4 are block diagrams illustrating a system 500 for providing escape directions, in accordance with one embodiment of the present disclosure. Some of the elements that have been described above with reference to FIGS. 1-4 have been described as employing a processor, such as a hardware processor, and a form of memory, such as hardware, memory to perform functions. In one embodiment, the system 500 for providing a personalized escape plan includes at least one database 41 for floorplans of a structure; and at least one sensor interface 42 for detecting a hazard on the floorplan. The system 500 further includes a dynamic escape map calculator 200 that includes a hazard growth calculator 43 to determine hazard growth; and a hazard growth escape plan generator 44 using hazard growth score and the hazard location on the floorplan. The system 500 may further include an asset recovery escape plan calculator, e.g., object removal remapping calculator 500, that recalculates the dynamic escape plan to account for the person 10 to carry an asset 35 during exiting the structure having the floor in response to the hazard 30. Additionally, the system 500 may further include an interface, e.g., micro instruction interface 50, to an augmented reality system worn by the person, wherein instructions for the person to exit the data center in response to the hazard carrying the asset are forwarded to the participant using the augmented reality system. Each of the components for the emergency direction system 500 that is depicted in FIG. 4 may be interconnected via a system bus 102.

Any of the systems or machines (e.g., devices) shown in FIG. 4 may be, include, or otherwise be implemented in a special-purpose (e.g., specialized or otherwise non-generic) computer that has been modified (e.g., configured or programmed by software, such as one or more software modules of an application, operating system, firmware, middleware, or other program) to perform one or more of the functions described herein for that system or machine. For example, a special-purpose computer system able to implement any one or more of the methodologies described herein is discussed above with respect to FIGS. 1-4, and such a special-purpose computer may, accordingly, be a means for performing any one or more of the methodologies discussed herein. Within the technical field of such special-purpose computers, a special-purpose computer that has been modified by the structures discussed herein to perform the functions discussed herein is technically improved compared to other special-purpose computers that lack the structures discussed herein or are otherwise unable to perform the functions discussed herein. Accordingly, a special-purpose machine configured according to the systems and methods discussed herein provides an improvement to the technology of similar special-purpose machines.

Figure 5:
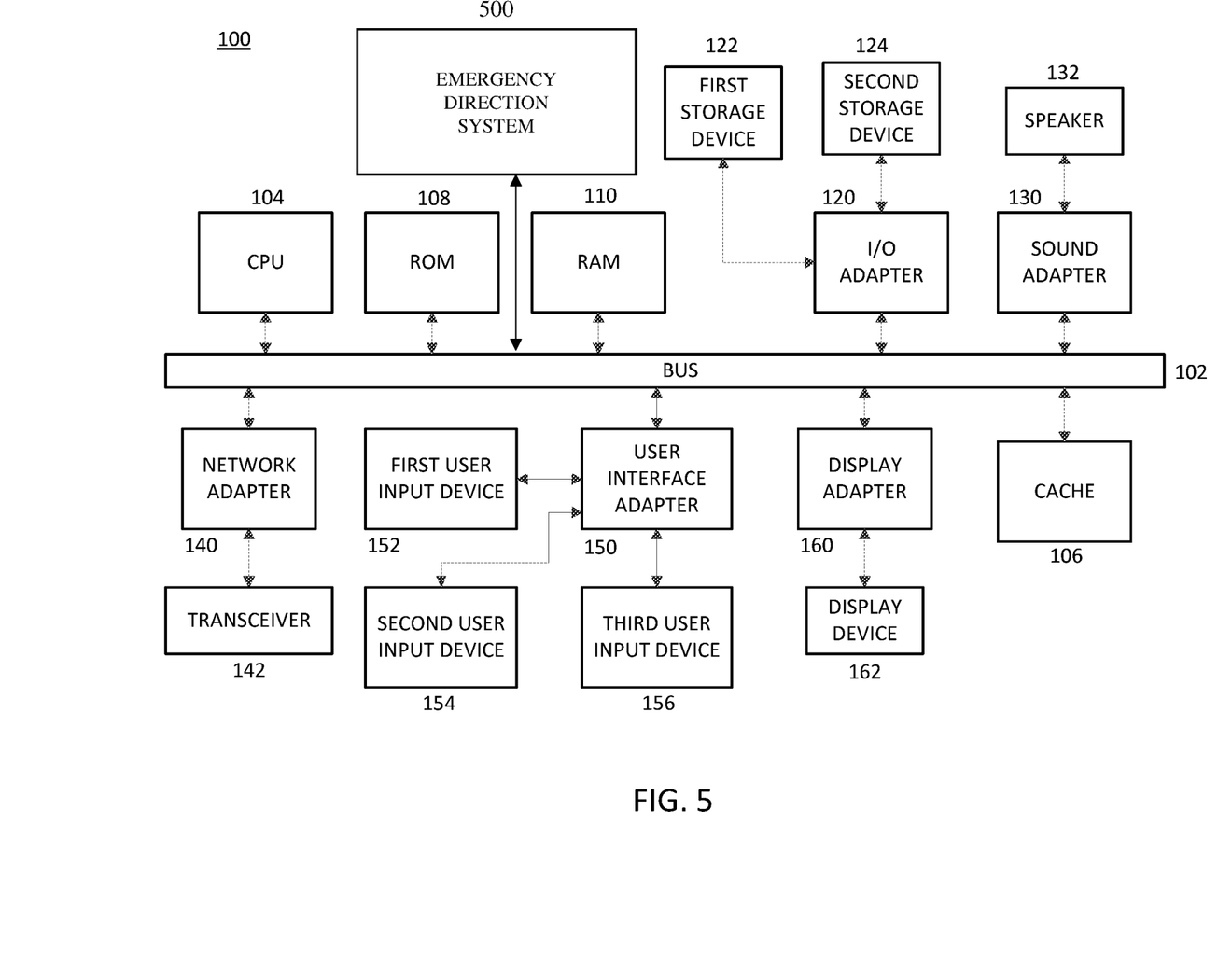
FIG. 5 is a block diagram illustrating a system that can incorporate the augmented reality (AR) system depicted in FIGS. 3 and 4 for providing directions to a person to navigate a data center (DC) when there is an emergency, in accordance with one embodiment of the present disclosure.

The escape direction system 500 may be integrated into the processing system 400 depicted in FIG. 5. The processing system 400 includes at least one processor (CPU) 104 operatively coupled to other components via a system bus 102. A cache 106, a Read Only Memory (ROM) 108, a Random Access Memory (RAM) 110, an input/output (I/O) adapter 120, a sound adapter 130, a network adapter 140, a user interface adapter 150, and a display adapter 160, are operatively coupled to the system bus 102. The bus 102 interconnects a plurality of components has will be described herein.

The system 400 depicted in FIG. 5, may further include a first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A speaker 132 is operatively coupled to system bus 102 by the sound adapter 130. A transceiver 142 is operatively coupled to system bus 102 by network adapter 140. A display device 162 is operatively coupled to system bus 102 by display adapter 160.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 400.

Of course, the processing system 400 may also include other elements (not shown), as readily contemplated by one of skill in the art, as well as omit certain elements. For example, various other input devices and/or output devices can be included in processing system 400, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 400 are readily contemplated by one of ordinary skill in the art given the teachings of the present invention provided herein.

The present invention may be a system, a method, and/or a computer program product at any possible technical detail level of integration. The computer program product can provide a personalized escape plan. The computer program product may include a computer readable storage medium (or media) having computer readable program instructions thereon for causing a processor to carry out aspects of the present invention. For example, the present disclosure provides a computer program product comprising a non-transitory computer readable storage medium having computer readable program code embodied therein for controlling a secondary system with a primary system for taking commands. The method provided by the steps stored on the computer program product may include registering a participant to an emergency direction system that employs an augmented reality system to provide instructions to the participant to exit a structure, wherein the system collects data from the participant, and the user can revoke permission at any time. The method may further include receiving a floor plan for the structure; and detecting detect a hazard to calculate a hazard growth score. In following steps, the method may include computing a dynamic escape plan using a hazard growth score and the hazard location; and recalculating the dynamic escape plan to account for the person to carry an asset during exiting the structure corresponding to the floor plan in response to the hazard. The method may further transmit instructions for the person to exit the data center in response to the hazard carrying the asset are forwarded to the participant using the augmented reality system.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The methods of the present disclosure may be practiced using a cloud computing environment. Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models. Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is service oriented with a focus on statelessness, low coupling, modularity, and semantic interoperability. At the heart of cloud computing is an infrastructure comprising a network of interconnected nodes.

Figure 6:
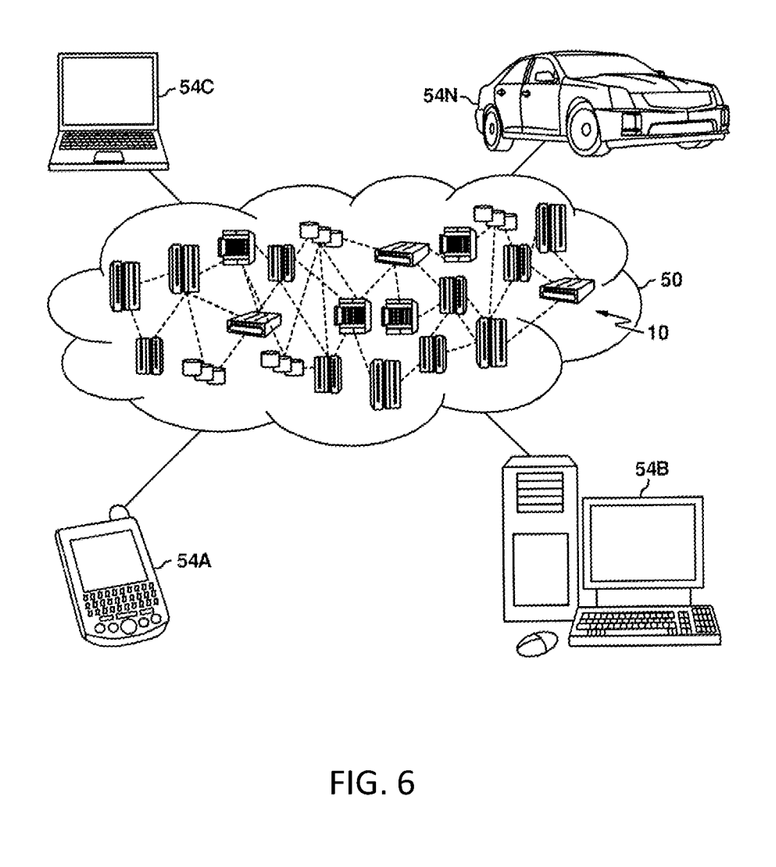
FIG. 6 depicts a cloud computing environment according to an embodiment of the present disclosure.

Referring now to FIG. 6, illustrative cloud computing environment 50 is depicted. As shown, cloud computing environment 50 includes one or more cloud computing nodes 51 with which local computing devices used by cloud consumers, such as, for example, mobile and/or wearable electronic devices 54A, desktop computer 54B, laptop computer 54C, and/or automobile computer system 54N may communicate. Nodes 110 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 51 and cloud computing environment 50 can communicate with any type of computerized device over any type of network and/or network addressable connection (e.g., using a web browser).

Figure 7:
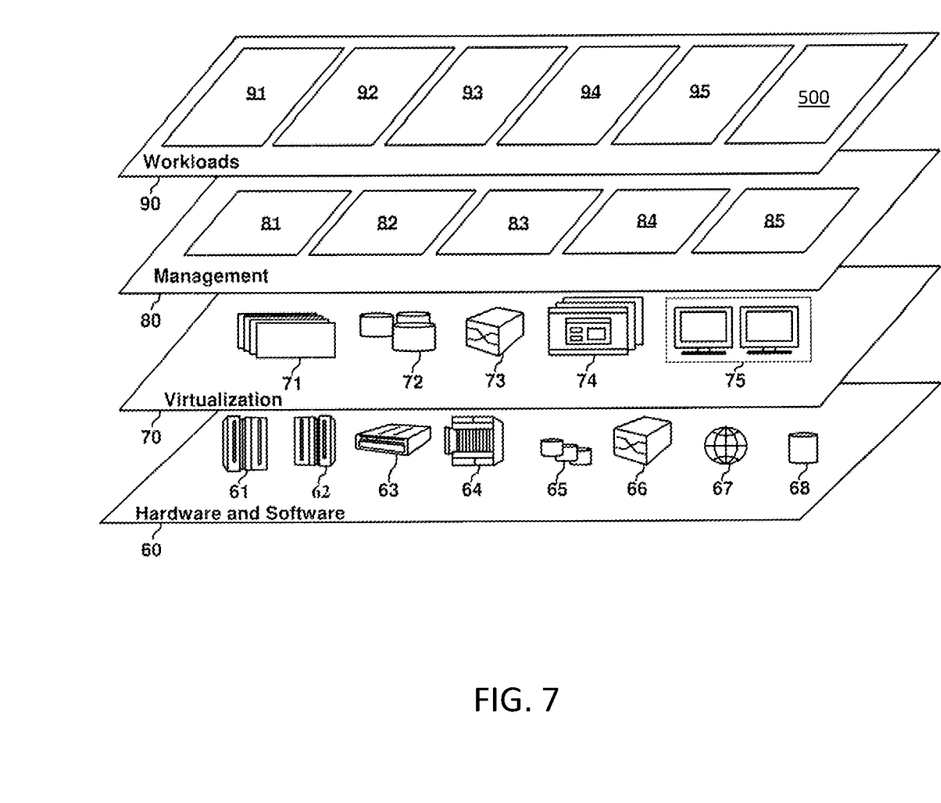
FIG. 7 depicts abstraction model layers according to an embodiment of the present disclosure.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application for the emergency direction system 500, which is described with reference to FIGS. 1-6.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of an augmented reality based dynamic guidance enabling directions to exit a location (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A computer implemented method for calculating a personalized escape plan comprising:
    registering a participant to an emergency direction system that employs an augmented reality system to provide instructions to the participant to exit a structure, wherein the system collects data from the participant, and wherein permission to collect data from the participant is revocable at any time by the participant;
    receiving a floor plan for the structure;
    detecting a hazard to calculate a hazard growth score;
    computing a dynamic escape plan using a hazard growth score and the hazard location;
    recalculating the dynamic escape plan to account for the person to carry an asset during exiting the structure corresponding to the floor plan in response to the hazard; and
    transmitting instructions for the person carrying the asset to exit the data center, the instructions including an identification of the asset on the floorplan that is displayed on augmented reality glasses.

2. The computer implemented method of claim 1, wherein the structure is a data center.

3. The computer implemented method of claim 1, wherein the hazard is selected from the group consisting of smoke, fire, wind, temperature, pollutants and combinations thereof.

4. The computer implemented method of claim 1, wherein the hazard growth score is measured from sensors that measure spread of the hazard on the floor plan.

5. The computer implemented method of claim 4, wherein the sensors includes at least one video camera that employs machine vision.

6. The computer implemented method of claim 1, wherein said recalculating the dynamic escape plan to account for the person to carry the asset comprises detecting an asset on a pathway of the dynamic escape plan by matching a sensed object to an object in an asset value database.

7. The computer implemented method of claim 6, wherein said matching a sensed object to an object in an asset value database comprises at least one video camera that employs machine vision.

8. A system for providing a personalized escape plan comprising:
    at least one database for floorplans of a structure;
    at least one sensor interface for detecting a hazard on the floorplan;
    a hazard growth calculator to determine hazard growth;
    a hazard growth escape plan generator using hazard growth score and the hazard location on the floorplan;
    an asset recovery escape plan calculator that recalculates the dynamic escape plan to account for the person to carry an asset during exiting the structure having the floor in response to the hazard; and
    an interface to an augmented reality system worn by the person, wherein instructions for the person to exit the data center in response to the hazard carrying the asset are forwarded to the participant using the augmented reality system, the instructions to make directional changes on the floorplan including an identification of the asset that is displayed on augmented reality glasses.

9. The system of claim 8, wherein the structure is a data center.

10. The system of claim 8, wherein the hazard is selected from the group consisting of smoke, fire, wind, temperature, pollutants and combinations thereof.

11. The system of claim 8, wherein the hazard growth score is measured from sensors that measure spread of the hazard on the floor plan.

12. The system of claim 11, wherein the sensors in communication with the at least one sensor interface include at least one video camera that employs machine vision.

13. The system of claim 8, wherein said asset recovery escape plan calculator provides for recalculating the dynamic escape plan to account for the person to carry the asset comprises detecting an asset on a pathway of the dynamic escape plan by matching a sensed object to an object in an asset value database.

14. The system of claim 13, wherein said matching a sensed object to an object in an asset value database comprises at least one video camera that employs machine vision.

15. A non-transitory computer readable storage medium comprising a computer readable program for calculating a personalized escape plan for a user, wherein the computer readable program when executed on a computer causes the computer to perform the steps of:

registering a participant to an emergency direction system that employs an augmented reality system to provide instructions to the participant to exit a structure, wherein the system collects data from the participant, and wherein permission to collect data from the participant is revocable at any time by the participant;

receiving a floor plan for the structure;

detecting detect a hazard to calculate a hazard growth score;

computing a dynamic escape plan using a hazard growth score and the hazard location;

recalculating the dynamic escape plan to account for the person to carry an asset during exiting the structure corresponding to the floor plan in response to the hazard; and transmitting instructions for the person to exit the data center, the instructions including an identification of the asset on the floorplan including indications on when to make directional changes that is displayed on augmented reality glasses.

16. The non-transitory computer readable storage medium of claim 15, wherein the structure is a data center.

17. The non-transitory computer readable storage medium of claim 15, wherein the hazard growth score is measured from sensors that measure spread of the hazard on the floor plan.

18. The non-transitory computer readable storage medium of claim 17, wherein the sensors includes at least one video camera that employs machine vision.

19. The non-transitory computer readable storage medium of claim 15, wherein said recalculating the dynamic escape plan to account for the person to carry the asset comprises detecting an asset on a pathway of the dynamic escape plan by matching a sensed object to an object in an asset value database.

20. The non-transitory computer readable storage medium of claim 19, wherein said matching a sensed object to an object in an asset value database comprises at least one video camera that employs machine vision.

\* \* \* \* \*